(12) United States Patent
Mitter et al.

(10) Patent No.: US 10,744,969 B2
(45) Date of Patent: Aug. 18, 2020

(54) CHILD SAFETY SEAT

(71) Applicant: NACHFOLGER GMBH, Vienna (AT)

(72) Inventors: Gerd Mitter, Vienna (AT); Rainald Keller, Vienna (AT)

(73) Assignee: NACHFOLGER GMBH, Vienna (AT)

( * ) Notice: Subject to any disclaimer, the term of this patent is extended or adjusted under 35 U.S.C. 154(b) by 0 days.

(21) Appl. No.: 16/320,583

(22) PCT Filed: Jul. 27, 2017

(86) PCT No.: PCT/AT2017/060191
§ 371 (c)(1),
(2) Date: Jan. 25, 2019

(87) PCT Pub. No.: WO2018/018060
PCT Pub. Date: Feb. 1, 2018

(65) Prior Publication Data
US 2019/0248321 A1 Aug. 15, 2019

(30) Foreign Application Priority Data
Jul. 27, 2016 (AT) .............................. A 50679/2016

(51) Int. Cl.
| *B60N 2/28* | (2006.01) |
| *B60R 21/207* | (2006.01) |
| *B60N 2/68* | (2006.01) |
| *B60N 2/90* | (2018.01) |

(52) U.S. Cl.
CPC ........ *B60R 21/2072* (2013.01); *B60N 2/2806* (2013.01); *B60N 2/2812* (2013.01);
(Continued)

(58) Field of Classification Search
CPC .. B60R 21/2072; B60N 2/914; B60N 2/2806; B60N 2/2812; B60N 2/2842;
(Continued)

(56) References Cited

U.S. PATENT DOCUMENTS

| 5,022,669 A | 6/1991 | Johnson |
| 5,711,574 A * | 1/1998 | Barnes ................... B60N 2/002 297/216.11 |

(Continued)

FOREIGN PATENT DOCUMENTS

| DE | 9407584 U1 | 10/1994 |
| EP | 2502780 A1 | 9/2012 |
| EP | 2546096 A1 | 1/2013 |

OTHER PUBLICATIONS

ISA European Patent Office, International Search Report Issued in Application No. PCT/AT2017/060191, dated Oct. 20, 2017, WIPO, 4 pages.

*Primary Examiner* — Philip F Gabler
(74) *Attorney, Agent, or Firm* — McCoy Russell LLP

(57) ABSTRACT

The invention relates to a child safety seat for fastening to a vehicle seat, said child safety seat having a seat element, a backrest element, a first side element with a first inflatable air chamber, and a second side element with a second inflatable air chamber. The first side element is connected to a first longitudinal edge of the backrest element and a first longitudinal edge of the seat element, and the second side element is connected to a second longitudinal edge of the backrest element and a second longitudinal edge of the seat element. A first tensile element is connected to the first longitudinal edge of the backrest element and the first longitudinal edge of the seat element, and a second tensile element is connected to the second longitudinal edge of the backrest element and the second longitudinal edge of the seat element.

22 Claims, 7 Drawing Sheets

(52) U.S. Cl.
CPC ......... *B60N 2/2842* (2013.01); *B60N 2/2863* (2013.01); *B60N 2/2884* (2013.01); *B60N 2/686* (2013.01); *B60N 2/914* (2018.02); *B60N 2002/684* (2013.01)

(58) Field of Classification Search
CPC .... B60N 2/2863; B60N 2/2884; B60N 2/686; B60N 2002/684
See application file for complete search history.

(56) References Cited

U.S. PATENT DOCUMENTS

| | | | | |
|---|---|---|---|---|
| 5,746,467 | A * | 5/1998 | Jesadanont | B60N 2/4221 296/68.1 |
| 6,179,383 | B1 * | 1/2001 | Ochi | A47C 4/54 297/250.1 |
| 6,871,908 | B2 * | 3/2005 | Takizawa | B60N 2/2812 297/216.11 |
| 7,347,494 | B2 * | 3/2008 | Boyle | B60N 2/2806 297/253 |
| 8,690,188 | B2 * | 4/2014 | Fiore | B60N 2/2812 280/733 |
| 8,764,108 | B2 * | 7/2014 | Gaudreau, Jr. | B60N 2/2812 297/250.1 |
| 8,991,935 | B2 * | 3/2015 | Balensiefer, II | B60N 2/2812 297/216.11 |
| 9,174,555 | B2 * | 11/2015 | Rajasingham | B60N 2/2812 |
| 2007/0085394 | A1 | 4/2007 | Yang | |
| 2015/0102644 | A1 * | 4/2015 | Rajasingham | B60N 2/2884 297/216.11 |
| 2015/0175035 | A1 * | 6/2015 | Balensiefer, II | B60N 2/2812 297/256.15 |

* cited by examiner

CHILD SAFETY SEAT

CROSS-REFERENCE TO RELATED APPLICATIONS

The present application is a U.S. National Phase of International Patent Application Serial No. PCT/AT2017/060191 entitled "CHILD SAFETY SEAT," filed on Jul. 27, 2017. International Patent Application Serial No. PCT/AT2017/060191 claims priority to Austrian Patent Application No. A 50679/2016, filed on Jul. 27, 2016. The entire contents of each of the above-cited applications are hereby incorporated by reference in their entirety for all purposes.

TECHNICAL FIELD

The invention relates to a child safety seat for fastening to a vehicle seat of a vehicle in the opposite direction to the direction of travel of the vehicle, having a seat element, a backrest element, a first side element with a first inflatable air chamber and a second side element with a second inflatable air chamber, wherein the first side element is connected to a first longitudinal edge of the backrest element and to a first longitudinal edge of the seat element, and the second side element is connected to a second longitudinal edge of the backrest element and to a second longitudinal edge of the seat element.

The invention additionally relates to a vehicle having such a child safety seat.

BACKGROUND AND SUMMARY

An example of a child safety seat was disclosed in EP 2 546 096 B1. The known child safety seat is mounted in the opposite direction to the direction of travel of the vehicle. By this means, in particular the head of the child may be better protected in the case of a sudden deceleration. In this prior art, it was additionally already proposed to equip at least individual parts of the seat shell, consisting of two side parts, a seat part, and a backrest part, with inflatable air chambers. For this purpose, in particular so-called drop stitch fabric was used in which two flat fabric pieces are arranged at a prespecified distance to one another using vertical threads. This embodiment has the advantage that the seat shell may have a high rigidity and form stability in the inflated state. On the other hand, the child safety seat may be easily transported in the non-inflated state. Finally, the weight may be reduced.

In practice, the insufficient stability of such child safety seats, on which high demands have been placed by the relevant regulatory authorities, has proven problematic up to now. An embodiment was disclosed in EP 2 546 096 B1, in which reinforcing straps were applied to the child safety seat. A first reinforcing strap was arranged on the outer side and a second reinforcing strap on the inner side of the child safety seat. The inner reinforcing strap was fastened on each side part at three fastening points. However, this embodiment includes the disadvantage that the force dissipation from the backrest part into the seat part is insufficient.

Such a child safety seat is additionally known from EP 2 502 780 A1.

U.S. Pat. No. 5,022,669 A discloses a child safety seat on which wheels are arranged on the underside so that the child safety seat is also usable as a child's pushchair.

The object of the invention is to resolve or to alleviate the disadvantages of the prior art. In particular, the goal of the invention is to improve the stability of the child safety seat of the type mentioned at the outset so that the peak forces acting on the child in the case of an impact of the vehicle are reduced.

This problem is solved by a child safety seat for fastening to a vehicle seat of a vehicle in the opposite direction of travel of the vehicle, the child safety seat comprising a backrest element, a first side element with a first inflatable air chamber, and a second side element with a second inflatable air chamber, wherein the first side element is connected to a first longitudinal edge of the backrest element and to a first longitudinal edge of the seat element, and the second element is connected to a second longitudinal edge of the backrest element and to a second longitudinal edge of the seat element.

According to the invention, a first tensile element is respectively connected to the first longitudinal edge of the backrest element and to the first longitudinal edge of the seat element, and a second tensile element is respectively connected to the second longitudinal edge of the backrest element and to the second longitudinal edge of the seat element, wherein the first tensile element and the second tensile element are arranged in a pretensioned state by the first and second side element.

By this means, a torque applied on the backrest element as a result of an impact of the vehicle may be reliably counteracted. The forces are dissipated from the backrest element directly into the seat element via the first and second tensile element, said seat element may be fastened using a seat belt (safety belt) to a vehicle seat in the opposite direction to the direction of travel. The first and second side elements are arranged on the backrest and seat elements such that the first and second tensile elements are tensioned in the inflated state of the first and second side elements, i.e., are under tension. Advantageously, it is not necessary in this embodiment to carry out a load dissipation via the first and second side elements, whose first and second air chambers are designed to be inflatable. For this purpose, a device for inflating the first and/or second air chambers may be provided. This device preferably has an inlet valve for introducing a filling gas. In contrast, the seat element and the backrest element are preferably free of an inflatable air chamber. The seat element and the backrest element each preferably have a higher weight per volume than the first and second side elements in the inflated state.

It is additionally preferred if the first and second side element are designed substantially identically.

In one preferred embodiment, the first and second side element each comprise a first flat fabric and a second flat fabric, which are connected to one another via vertical threads while leaving the first or second air chamber free (so-called drop stitch fabric). By this means, the first and second side elements are dimensionally stable and rigid in the inflated state.

For the purpose of this disclosure, the indications of location and direction, like "front", "back", "above", "below", "toward the front", "toward the back" relate to the intended mounted state on the vehicle seat.

In order to stiffen the backrest element with respect to the seat element in the case of a frontal impact of the vehicle, it is advantageous if the first tensile element is respectively fastened to an upper end region of the first longitudinal edge of the backrest element and to a front end region of the first longitudinal edge of the seat element, wherein the second tensile element is respectively fastened to an upper end region of the second longitudinal edge of the backrest element and to a front end region of the second longitudinal edge of the seat element.

The stability of the child safety seat may be further improved if a third tensile element is respectively connected to the first longitudinal edge of the backrest element and to the first longitudinal edge of the seat element, and a fourth tensile element is respectively connected to the second longitudinal edge of the backrest element and to the second longitudinal edge of the seat element.

The first and second tensile elements may be connected to one another via a fifth tensile element and/or via a sixth tensile element. The fifth tensile element preferably extends in the region of an upper transverse edge of the backrest element. The sixth tensile element preferably extends in the region of a front transverse edge of the seat element. In this embodiment, the first, second, fifth, and/or sixth tensile elements may be designed as segments of an interconnected tensile element.

To transfer forces between the backrest element and the seat element, it is particularly favorable if the first and/or second and/or third and/or fourth tensile element is a traction cable, a traction belt, or a chain.

In order to be able to transfer the child safety seat in the non-inflated state of the first and second side elements into a compact transport position, it is advantageous if the backrest element comprises an upper backrest part and a lower backrest part, wherein the upper backrest part is connected to the lower backrest part via an articulated connection.

In order to stabilize the two-part backrest element against forces occurring during an accident, it is favorably if the one end of the third tensile element is fastened to an upper end region of the first longitudinal edge of the lower backrest part and the one end of the fourth tensile element is fastened to an upper end region of the second longitudinal edge of the lower backrest part, wherein the other end of the third tensile element is preferably fastened substantially at the center to the first longitudinal edge of the seat element and the other end of the fourth tensile element is preferably fastened substantially at the center to the second longitudinal edge of the seat element.

For stable fastening of the child safety seat to the vehicle seat, the seat element comprises according to a preferred embodiment a first and a second through opening for guiding through a belt segment of a safety belt. During the mounting of the child safety seat, the belt segment of the safety belt (seat belt) may be guided from below through the first through opening to the upper side of the seat element. Afterwards, the belt segment may be pulled substantially transversely to the seat element and guided through the second through opening, in order to finally connect a buckle tongue of the safety belt to a belt buckle.

For guiding the safety belt, the seat element preferably comprises a first deflection edge adjacent to the first through opening and a second deflection edge adjacent to the second through opening for the belt segment of the safety belt.

To facilitate a particularly effective force transfer from the backrest element to the seat element via the first, second, third, and fourth tensile elements, the first deflection edge of the seat element extends preferably between the fastening points of the first and third tensile elements on the first longitudinal edge of the seat element, when viewed in the longitudinal direction of the seat element, wherein the second deflection edge of the seat element extends between the fastening points of the second and fourth tensile elements on the second longitudinal edge of the seat element, when viewed in the longitudinal direction of the seat element.

In order to reliably apply the belt segment of the safety belt on the seat element, the first and/or the second deflection edge of the seat element may be flattened. The first and/or second deflection edge is respectively preferably arranged at an acute angle to the section to the seat element between the first and second through opening.

To facilitate the deflection of the belt segment on the seat element, the first and/or second through opening preferably comprises a section that widens in a direction away from a front edge of the seat element. Consequently, the opening width of the first and/or second through opening increases toward the rear (i.e., in the direction of the backrest element) in a top view. By this means, the first and/or second deflection edge is arranged at an angle to the first or second longitudinal edge of the seat element, so that the folding over of the belt segment of the safety belt is facilitated during mounting of the child safety seat to the vehicle seat.

In order to reliably hold the safety belt on the child safety seat in the secured state, a belt clamp for clamping at least one belt segment of the safety belt is preferably provided between the first and second through openings of the seat element when viewed in the transverse direction of the seat element.

With regard to a compact transport position of the child safety seat, it is provided in one preferred embodiment that the backrest element, in particular the lower backrest part of the backrest element, is preferably articulatedly connected to the seat element via a slip joint (or slide joint) or via a film hinge.

According to one preferred embodiment, the first side element comprises at least one first guide element on an inner side for guiding the first tensile element and/or at least one second guide element for guiding the third tensile element and/or the second side element comprises at least one third guide element on an inner side for guiding the second tensile element and/or the second side element comprises at least one fourth guide element on an inner side for guiding the fourth tensile element.

In order to provide a dimensionally stable seat shell, it is favorable if the seat element and/or the backrest element is manufactured substantially from a hard plastic material, in particular from polyamide or polypropylene, or from a fiber reinforced plastic material.

For force dissipation in the vehicle in the case of a rear impact, it is favorable if the first side element comprises a contact surface on a front face side for resting on a seat back of the vehicle seat in such a way that the upper end of the contact surface is arranged in the mounted state of the child safety seat at a distance of at least 170 mm to the lower end of the seat back when viewed in the longitudinal direction of the seat back.

BRIEF DESCRIPTION OF THE FIGURES

The invention will subsequently be described in detail by way of one preferred exemplary embodiment, with reference to the attached drawings, wherein.

DETAILED DESCRIPTION

Figure 1:
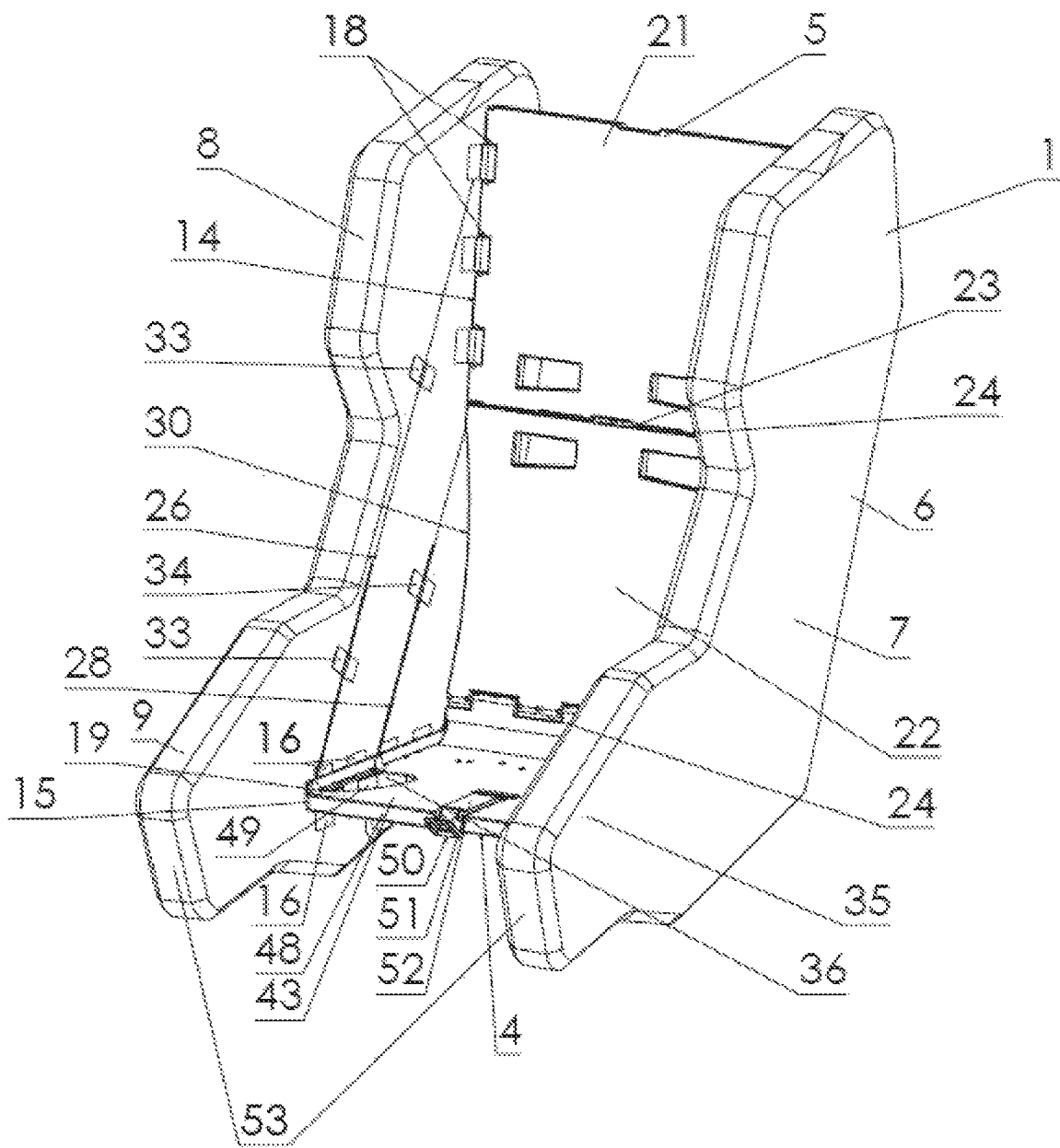
FIG. 1 shows a perspective view of a child safety seat according to the invention, which has a seat element, a backrest element, and a first and a second side element in the inflated state.
Figure 2:
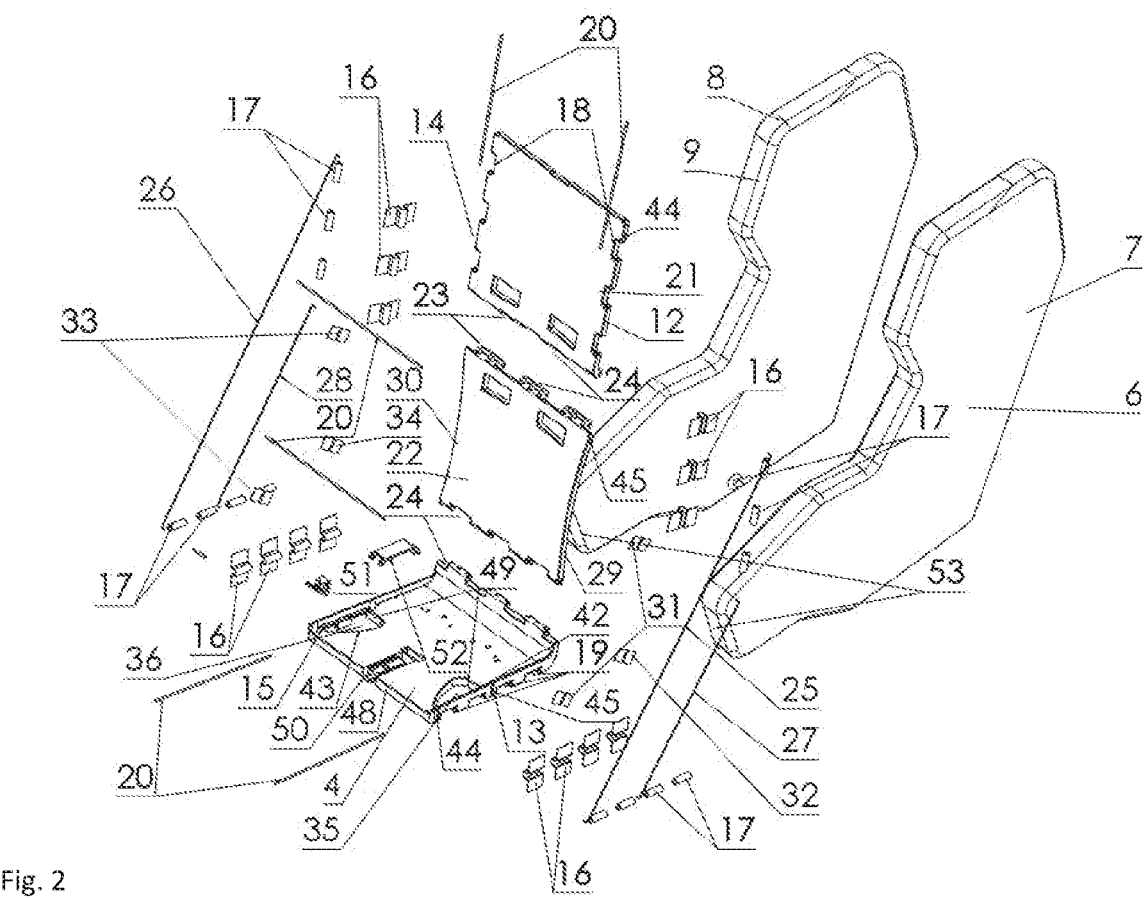
FIG. 2 shows an exploded view of the child safety seat according to FIG. 1.
Figure 3:
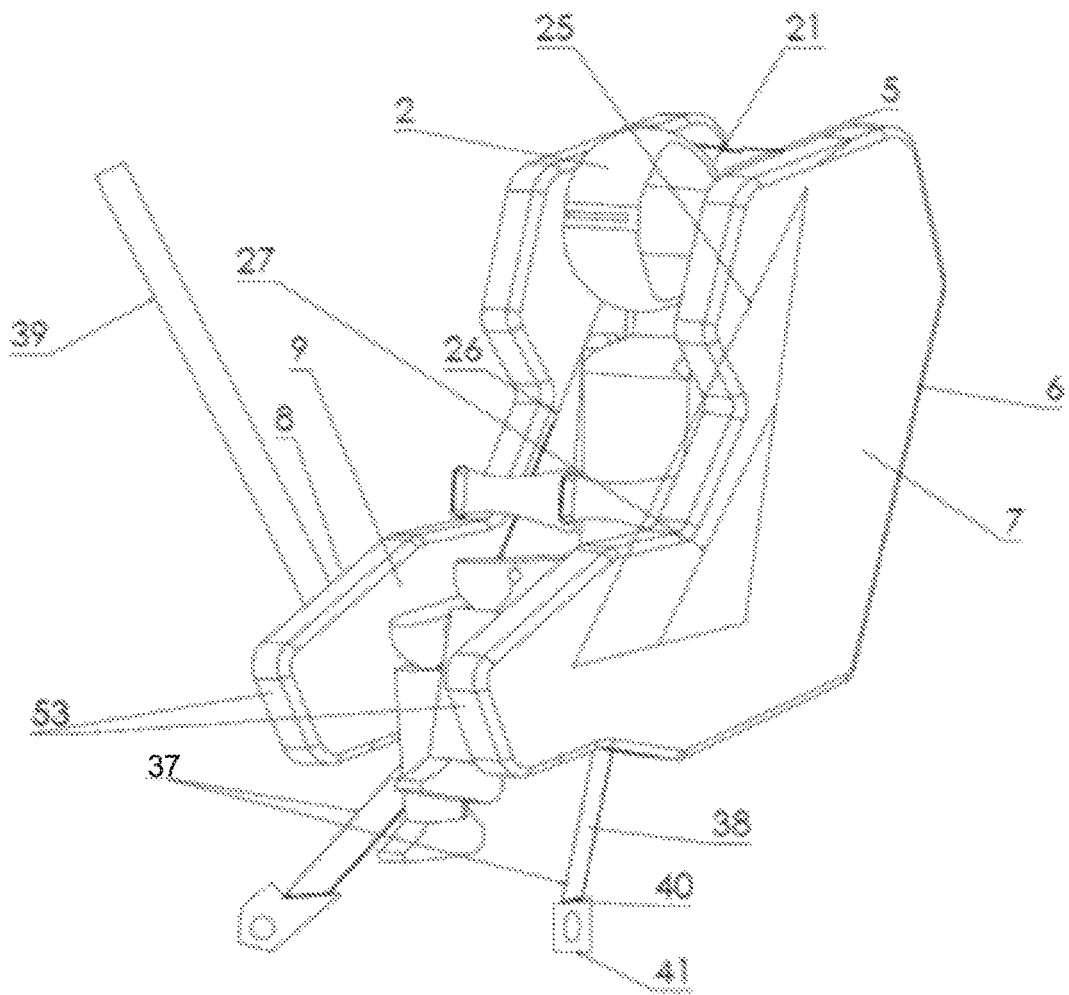
FIG. 3 shows a perspective view of the child safety seat according to FIGS. 1 and 2, wherein the arrangement of a safety belt is schematically depicted.

FIGS. 1 and 2 show a child safety seat 1 for a child, which is represented by a dummy 2 in FIG. 3. Child safety seat 1 is provided for fastening to a vehicle seat 3 of a vehicle, in particular a passenger vehicle, in the opposite direction to the direction of travel of the vehicle (compare FIG. 4). Child safety seat 1 has a seat element 4 which supports the buttocks of the child during intended use of child safety seat 1. In addition, child safety seat 1 has a backrest element 5, with which the back and the head of the child are supported during intended use of child safety seat 1. Padding (not shown in the figures) may be arranged on backrest element 5 and seat element 4. Backrest element 5 and seat element 4 define a seat opening angle, which is preferably greater than 90°.

Child safety seat 1 has on the sides (in relation to the direction of travel of the vehicle) a first side element 6 with a first inflatable air chamber 7 and a second side element 8 with a second inflatable air chamber 9. In contrast, seat element 4 and backrest element 5 are each formed from a dimensionally stable, non-inflatable material. Seat element 4 and backrest element 5 are preferably manufactured substantially from a hard plastic material, in particular from polyamide or polypropylene.

First side element 6 is respectively connected to a first longitudinal edge 12 of backrest element 5 and to a first longitudinal edge 13 of seat element 4. Second side element 8 is respectively connected to a second longitudinal edge 14 of backrest element 5 and to a second longitudinal edge 15 of seat element 4. First longitudinal edge 12 and second longitudinal edge 14 of backrest element 5 extend laterally on backrest element 5 and are connected to each other via an upper transverse edge and a lower transverse edge of backrest element 5. Correspondingly, first longitudinal edge 13 and second longitudinal edge 15 of seat element 4 extend laterally on seat element 4 and are connected to each other via an upper transverse edge and a lower transverse edge of seat element 4. In the embodiment shown, clips 16, in which insertion sleeves 17 are accommodated, are applied on the inner side of first side element 6 and second side element 8. Clips 16 with insertion sleeves 17 are arranged in lateral recesses 18 of the backrest element and lateral recesses 19 of the seat element and are fixed there using retaining rods 20. However, first side element 6 and second side element 8 might naturally also be fastened to backrest element 5 and seat element 4 in numerous other ways.

As is clear from FIG. 1, backrest element 5 has a upper backrest part 21 and a lower backrest part 22. Upper backrest part 21 is connected to lower backrest part 22 via an articulated connection 23. To form articulated connection 23 between upper backrest part 21 and lower backrest part 22, at least one slip joint, depicted in FIGS. 1 and 2 as three slip joints 24, may be provided. Furthermore, lower backrest part 22 of backrest element 5 is articulatedly connected to seat element 4. For this purpose in the embodiment shown, three slip joints 24 are provided between lower backrest part 22 and seat element 4.

In the inflated state, child safety seat 1 is of a similar size to a conventional child safety seat. In the folded together state, however, child safety seat 1 may be stowed in a substantially more compact form in a trunk or in a closet.

As is clear from FIG. 1, a first tensile element 25 and a second tensile element 26 are provided for tensioning backrest element 5 with respect to seat element 4. The one end of first tensile or tension element 25 is fixed to first longitudinal edge 12 of backrest element 5 and the other end of first tensile or tension element 25 is fixed to first longitudinal edge 13 of seat element 4. The one end of second tensile or tension element 26 is fixed to second longitudinal edge 14 of backrest element 5 and the other end of second tensile or tension element 26 is fixed to second longitudinal edge 15 of seat element 4. In the embodiment shown, first tensile element 25 is respectively fastened to an upper end region of first longitudinal edge 12 of backrest element 5 and to a front end region of first longitudinal edge 13 of seat element 4. Second tensile element 26 is respectively fastened to an upper end region of second longitudinal edge 14 of backrest element 5 and to a front end region of second longitudinal edge 15 of seat element 4.

As is clear from FIG. 1, a third tensile or tension element 27 and a fourth tensile or tension element 28 are provided in the embodiment shown. The ends of third tensile element 27 are respectively connected to the first longitudinal edge of backrest element 5 and to the first longitudinal edge of seat element 4. The ends of fourth tensile element 28 are respectively connected to the second longitudinal edge of backrest element 5 and to the second longitudinal edge of seat element 4. In the embodiment shown, the one end of third tensile element 27 is fastened to an upper end region of first longitudinal edge 29 of lower backrest part 22 and the one end of fourth tensile element 28 is fastened to an upper end region of second longitudinal edge 30 of lower backrest part 22. The other end of third tensile element 27 is fastened substantially at the center to first longitudinal edge 13 of seat element 4 and the other end of fourth tensile element 28 is fastened substantially at the center to second longitudinal edge 15 of seat element 4.

First tensile element 25, second tensile element 26, third tensile element 27, and fourth tensile element 28 are arranged in a tensioned state by the arrangement of first and second side elements 6, 8 in their inflated use positions. In the embodiment shown, first tensile element 25, second tensile element 26, third tensile element 27, and fourth tensile element 28 are provided as traction cables.

First side element 6 has on its inner side at least one first guide element 31, two first guide elements 31 in the embodiment shown, for guiding first tensile element 25, and at least one second guide element 32, precisely one second guide element 32 in the embodiment shown, for guiding third tensile element 27 on the inner side of first side element 6. Correspondingly, second side element 8 has on its inner side at least one third guide element 33, two third guide elements 33 in the embodiment shown, for guiding second tensile element 26, and a fourth guide element 34, precisely one fourth guide element 34 in the embodiment shown, for guiding fourth tensile element 28 on the inner side of second side element 8.

Figure 5:
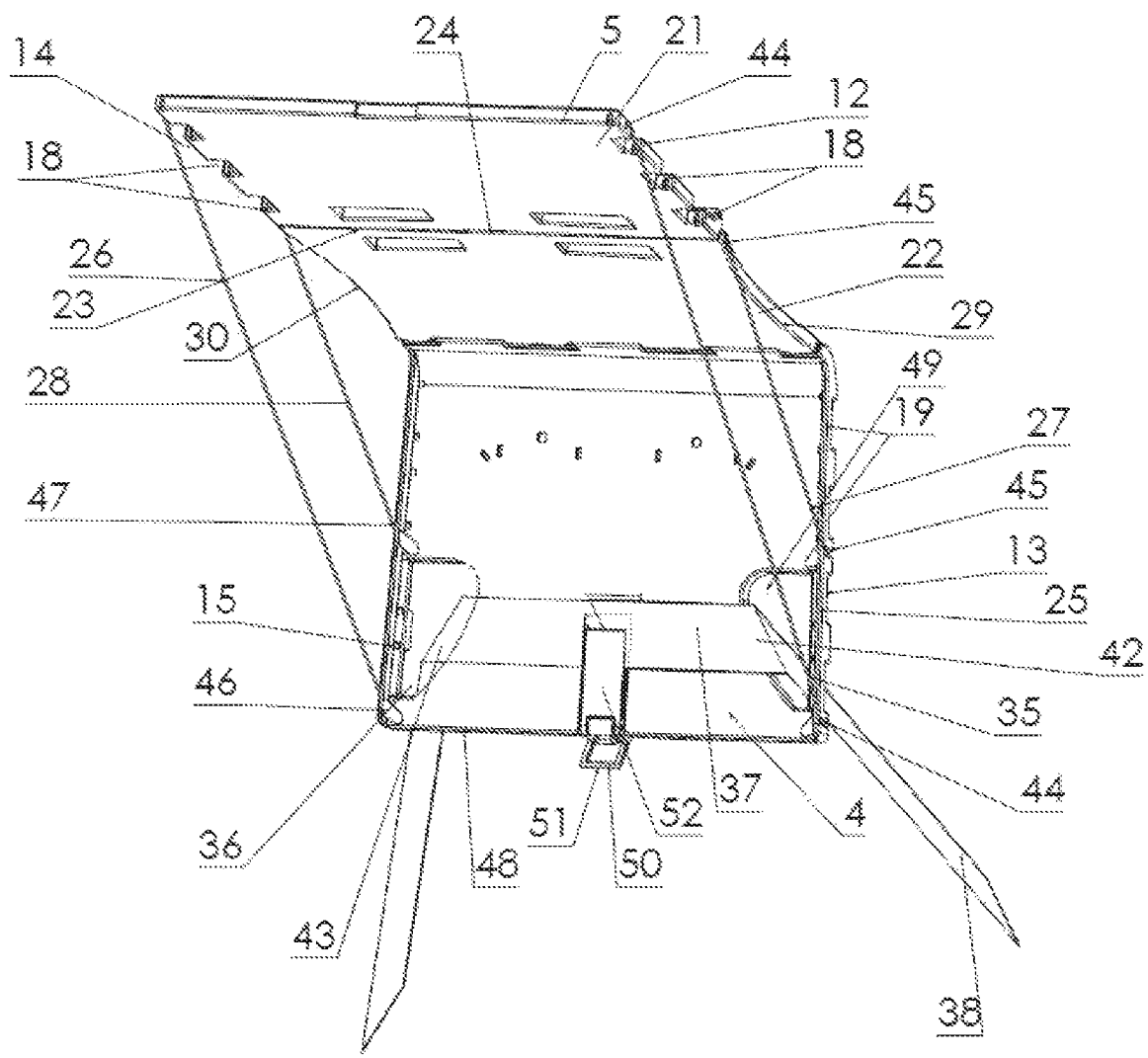
FIG. 5 shows a perspective view of parts of the child safety seat according to FIGS. 1 to 4.

As is clear from FIG. 1 (see, in particular, also FIG. 5), seat element 4 has a first through opening 35 and a second through opening 36 for guiding through a belt segment 37 of a seat belt (or safety belt) 38.

Figure 4:
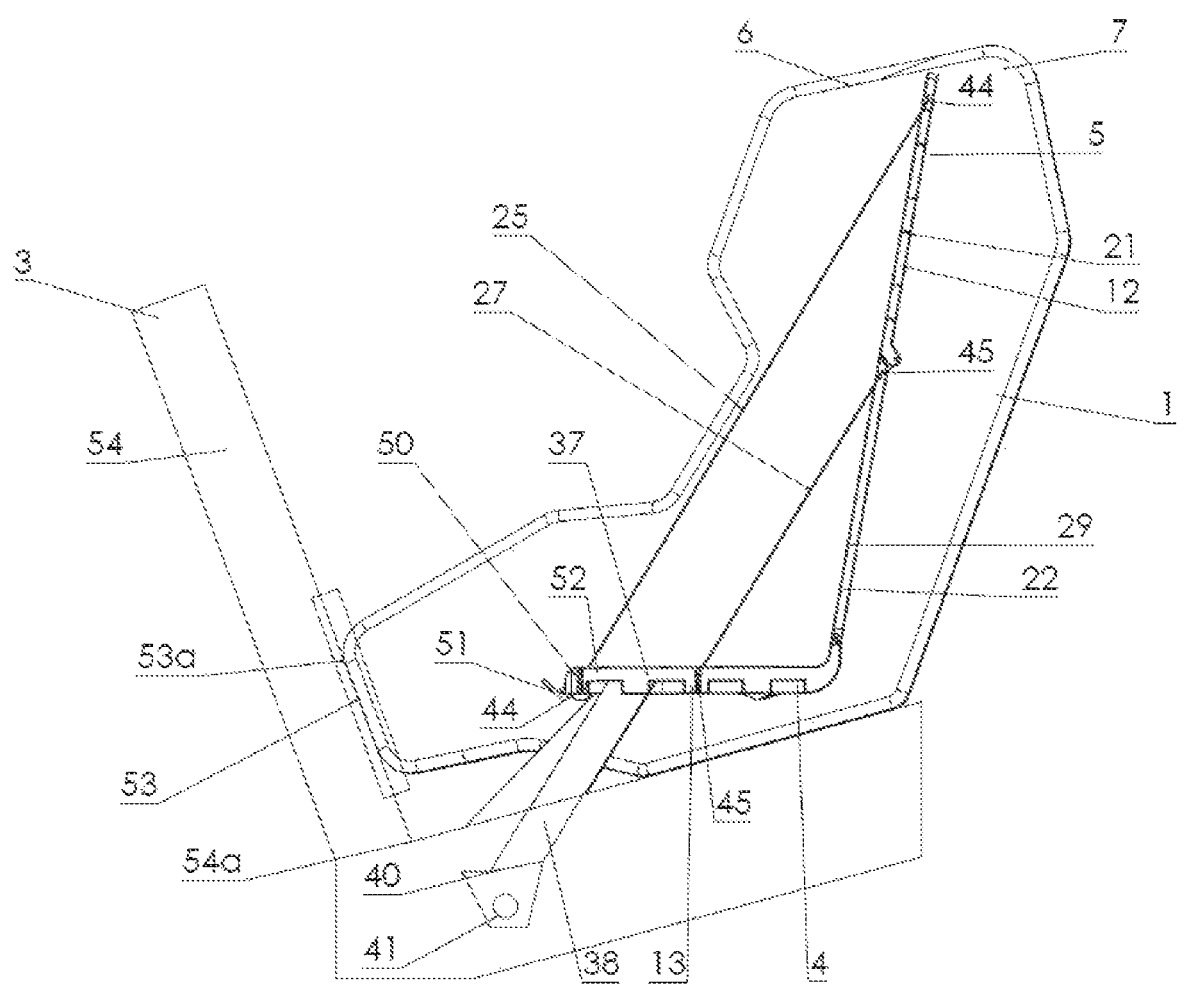
FIG. 4 shows a side view of the child safety seat according to FIGS. 1 to 3 in the mounted state on a vehicle seat, wherein one of the side elements is not drawn for a better overview.

As is clear from FIGS. 3 and 4, belt segment 37 in the embodiment shown is provided as a lap belt part 37 of a 3-point safety belt 38, which additionally has a shoulder belt part 39. Safety belt 38 additionally has a buckle tongue 40 at which lap belt part 37 transitions into shoulder belt part 39. Buckle tongue 40 may be detachably connected to a belt buckle 41 (schematically depicted in FIG. 3). A first deflection edge 42 is designed adjacent to first through opening 35, a second deflection edge 43 is designed adjacent to second through opening 36 for belt segment 37 of safety belt 38. First deflection edge 42 of seat element 4 extends between the fastening points of first and third tensile elements 44, 45 to first longitudinal edge 13 of seat element 4 when viewed in the longitudinal direction of seat element 4. Correspondingly, second deflection edge 43 of seat element 4 extends between the fastening points of second and fourth tensile elements 46, 47 to second longitudinal edge 15 of seat element 4 when viewed in the longitudinal direction of seat element 4. In the embodiment shown, first and second deflection edges 42, 43 of the seat element are flattened. Furthermore, first through opening 35 and second through opening 36 each have a section 49 that widens in the direction away from front edge 48 of the seat element.

As is clear from FIG. 1 (see in particular also FIG. 5), a belt clamp 50 for clamping at least one belt segment 37 of safety belt 38 is provided between first through opening 35 and second through opening 36 of seat element 4 when viewed in the transverse direction of seat element 4. Belt clamp 50 has a pivot lever 51 and a clamping element 52 so that belt segment 37 may be inserted into belt clamp 50 and clamped.

Belt 38 is guided through first through opening 35 and second through opening 36 and buckle tongue 40 is connected to belt buckle 41. By pulling on shoulder belt part 39, belt segment 37 (lap belt part) is tightened. If lap belt part 37 is tensioned, then shoulder belt part 39 is guided via lap belt part 37. Belt clamp 50 is closed in the tensioned state of belt 38 so that belt 38 does not slip into the tensioning trapezoid which lap belt part 37 forms in conjunction with child safety seat 1. By this means, it is reliably prevented that the connection between child safety seat 1 and vehicle seat 3 loosens during use.

As is clear from FIG. 4, first side element 6 and second side element 8 each have on the front face sides a contact surface 53 for resting on a seat back 54 of vehicle seat 3. In the intended use state of child safety seat 1, upper end 53a of contact surface 53 is arranged at a distance of at least 170 mm to the lower end 54a of seat back 54 when viewed in the longitudinal direction of seat back 54.

Figure 6:
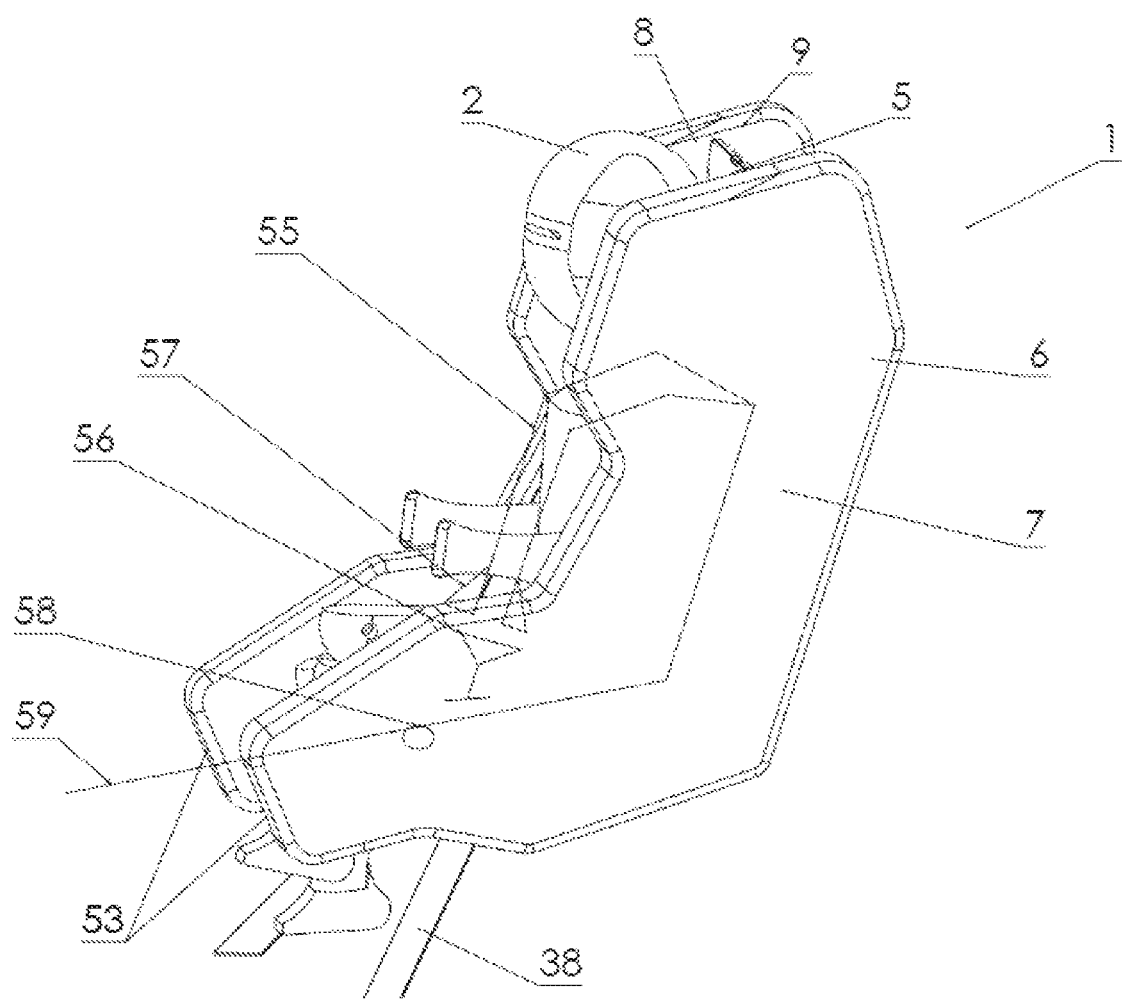
FIG. 6 shows another perspective view of the child safety seat according to FIGS. 1 to 5, wherein a child harness for securing a child in the child safety seat is schematically illustrated.

As is schematically clear from FIG. 6, child safety seat 1 has an integrated belt 55 with a belt buckle 56 which is arranged between the legs of the child. Belt buckle tongues 57 are snapped therein. Subsequently, belt 55 is pulled tight with a tension band 58 and fixed by means of a belt tensioner 59.

Figure 7:
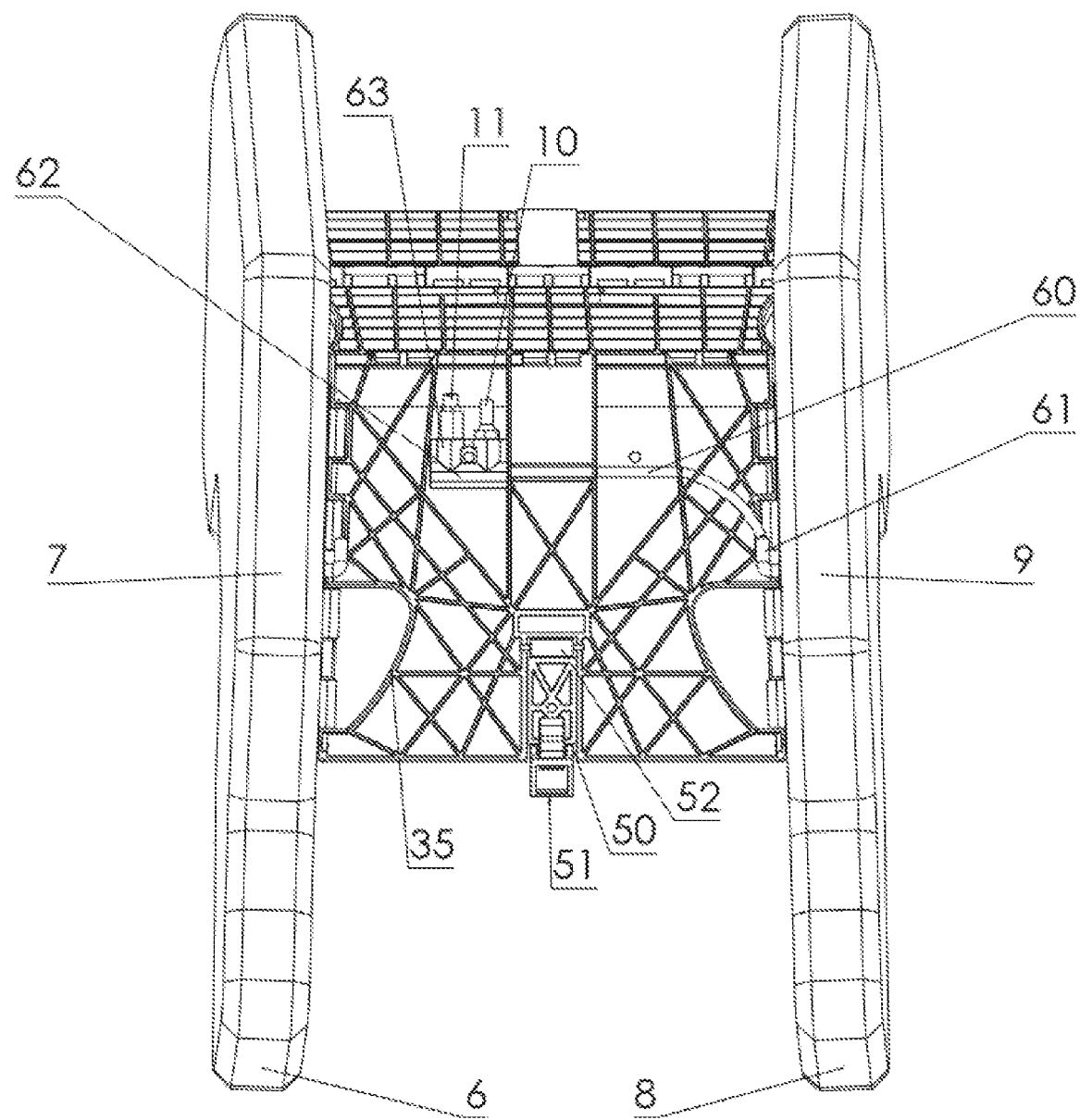
FIG. 7 shows the child safety seat according to FIGS. 1 to 6 from below, wherein a device for inflating the first and second side elements is schematically visible.

As is clear from FIG. 7, a device 63 is provided for inflating second air chamber 9, which is preferably arranged on the bottom of seat element 4. In the embodiment shown, device 63 has an inlet valve 10, via which filling gas may be supplied, an overpressure valve 11, a connecting unit 62 for gas-tight connection of inlet valve 10 and overpressure valve 11 to a hose connection 60, and a connecting piece 61 in order to bring the filling gas from hose connection 60 into second air chamber 9. A corresponding device may be provided for inflating first air chamber 7.

The invention claimed is:

1. A child safety seat for fastening to a vehicle seat of a vehicle, the child safety seat comprising a seat element, a backrest element, a first side element with a first inflatable air chamber, and a second side element with a second inflatable air chamber, wherein the first side element is connected to a first longitudinal edge of the backrest element and to a first longitudinal edge of the seat element, and the second side element is connected to a second longitudinal edge of the backrest element and to a second longitudinal edge of the seat element, characterized in that a first tensile element is respectively connected to the first longitudinal edge of the backrest element and to the first longitudinal edge of the seat element and a second tensile element is respectively connected to the second longitudinal edge of the backrest element and to the second longitudinal edge of the seat element, wherein the first tensile element and the second tensile element are arranged in a pretensioned state by the first side element and the second side element.

2. The child safety seat according to claim 1, wherein the first tensile element is respectively fastened to an upper end region of the first longitudinal edge of the backrest element and to a front end region of the first longitudinal edge of the seat element, wherein the second tensile element is respectively fastened to an upper end region of the second longitudinal edge of the backrest element and to a front end region of the second longitudinal edge of the seat element.

3. The child safety seat according to claim 1, further comprising a third tensile element respectively connected to the first longitudinal edge of the backrest element and to the first longitudinal edge of the seat element, and a fourth tensile element respectively connected to the second longitudinal edge of the backrest element and to the second longitudinal edge of the seat element.

4. The child safety seat according to claim 3, wherein a traction cable, a traction belt, or a chain is provided as one or more of the first tensile element, the second tensile element, the third tensile element, and the fourth tensile element.

5. The child safety seat according to claim 4, wherein the backrest element comprises an upper backrest part and a lower backrest part, wherein the upper backrest part is connected to the lower backrest part via an articulated connection.

6. The child safety seat of claim 5, wherein the lower backrest part of the backrest element is articulatedly connected to the seat element.

7. The child safety seat according to claim 5, wherein the one end of the third tensile element is fastened to an upper end region of the first longitudinal edge of the lower backrest part, and the one end of the fourth tensile element is fastened to an upper end region of the second longitudinal edge of the lower backrest part, wherein the other end of the third tensile element is fastened to the first longitudinal edge of the seat element and the other end of the fourth tensile element is fastened to the second longitudinal edge of the seat element.

8. The child safety seat according to claim 7, wherein the other end of the third tensile element is fastened substantially in the center to the first longitudinal edge of the seat element.

9. The child safety seat according to claim 7, wherein the other end of the fourth tensile element is fastened substantially in the center to the second longitudinal edge of the seat element.

10. The child safety seat according to claim 7, wherein the seat element comprises a first through opening and a second through opening for guiding through a belt segment of a safety belt.

11. The child safety seat according to claim 10, wherein the seat element comprises a first deflection edge adjacent to the first through opening and a second deflection edge adjacent to the second through opening for the belt segment of the safety belt.

12. The child safety seat according to claim 11, wherein the first deflection edge of the seat element extends between the fastening points of the first tensile element and the third tensile element on the first longitudinal edge of the seat element, when viewed in a longitudinal direction of the seat element, wherein the second deflection edge of the seat element extends between the fastening points of the second tensile element and the fourth tensile element on the second longitudinal edge of the seat element, when viewed in the longitudinal direction of the seat element.

13. The child safety seat according to claim 11, wherein the first deflection edge and/or the second deflection edge of the seat element is flattened.

14. The child safety seat according to claim 11, characterized in that the first through opening and/or the second through opening comprises a section widening in the direction away from a front edge of the seat element.

15. The child safety seat according to claim 11, wherein a belt clamp is provided for clamping at least one belt segment of the safety belt between the first through opening and the second through opening of the seat element when viewed in the transverse direction of the seat element.

16. The child safety seat according to claim 5, wherein the backrest element, is articulatedly connected to the seat element.

17. The child safety seat of claim 16, wherein the backrest element is articulatedly connected to the seat element via a slide joint or a film hinge.

18. The child safety seat according to claim 3, wherein the first side element comprises on an inner side at least one first guide element for guiding the first tensile element and/or at least one second guide element for guiding the third tensile element and/or the second side element comprises on an inner side at least one third guide element for guiding the second tensile element and/or the second side element comprises on an inner side at least one fourth guide element for guiding the fourth tensile element.

19. The child safety seat according to claim 1, wherein the seat element and/or the backrest element is manufactured substantially from a hard plastic material.

20. The child safety seat of claim 19, wherein the hard plastic is polyamide, polypropylene, or a fiber-reinforced plastic material.

21. The child safety seat according to claim 1, wherein the first side element comprises a contact surface on a front face side for resting on a seat back of the vehicle seat in such a way that the upper end of the contact surface is arranged in the mounted state of the child safety seat at a distance of at least 170 mm to the lower end of the seat back when viewed in a longitudinal direction of the seat back.

22. A vehicle with a vehicle seat and with a child safety seat which is fixed to the vehicle seat with the aid of a belt segment of a safety belt, wherein the child safety seat comprises a seat element, a backrest element, a first side element with a first inflatable air chamber, and a second side element with a second inflatable air chamber, wherein the first side element is connected to a first longitudinal edge of the backrest element and to a first longitudinal edge of the seat element, and the second side element is connected to a second longitudinal edge of the backrest element and to a second longitudinal edge of the seat element, further comprising a first tensile element respectively connected to the first longitudinal edge of the backrest element and to the first longitudinal edge of the seat element, and a second tensile element respectively connected to the second longitudinal edge of the backrest element and to the second longitudinal edge of the seat element, wherein the first tensile element and the second tensile element are arranged in a pretensioned state by the first side element and the second side element.

* * * * *